United States Patent
Ito et al.

(10) Patent No.: US 10,938,048 B2
(45) Date of Patent: Mar. 2, 2021

(54) ELECTROCHEMICAL CELL WITH CONTAMINANT TRAP PORTION, AND ELECTROCHEMICAL DEVICE INCLUDING SAME

(71) Applicant: NGK INSULATORS, LTD., Nagoya (JP)

(72) Inventors: Risako Ito, Nagoya (JP); Makoto Ohmori, Nagoya (JP)

(73) Assignee: NGK INSULATORS, LTD.

(*) Notice: Subject to any disclaimer, the term of this patent is extended or adjusted under 35 U.S.C. 154(b) by 4 days.

(21) Appl. No.: 16/246,831

(22) Filed: Jan. 14, 2019

(65) Prior Publication Data

US 2020/0127314 A1     Apr. 23, 2020

(30) Foreign Application Priority Data

Oct. 18, 2018   (JP) .............................. JP2018-196730

(51) Int. Cl.
| | |
|---|---|
| *H01M 8/0662* | (2016.01) |
| *B01D 53/04* | (2006.01) |
| *H01M 8/2432* | (2016.01) |
| *H01M 8/2484* | (2016.01) |
| *H01M 8/124* | (2016.01) |

(52) U.S. Cl.
CPC .......... *H01M 8/0662* (2013.01); *B01D 53/04* (2013.01); *H01M 8/2432* (2016.02); *H01M 8/2484* (2016.02); *H01M 2008/1293* (2013.01)

(58) Field of Classification Search
CPC ............. H01M 8/0662; H01M 8/2432; H01M 8/2484; B01D 53/04
See application file for complete search history.

(56) References Cited

U.S. PATENT DOCUMENTS

| | | | |
|---|---|---|---|
| 2004/0115507 A1* | 6/2004 | Potter ................ | H01M 8/2435 429/434 |
| 2011/0053046 A1 | 3/2011 | Gil et al. | |
| 2013/0011767 A1 | 1/2013 | Gil et al. | |
| 2017/0141426 A1* | 5/2017 | Ohmori ................ | H01M 8/249 |

FOREIGN PATENT DOCUMENTS

| | | |
|---|---|---|
| JP | 2013-020982 A | 1/2013 |
| JP | 2013-054970 A | 3/2013 |
| JP | 2015-090788 A | 5/2015 |
| JP | 2015-164094 A | 9/2015 |

OTHER PUBLICATIONS

Ishida Akira, "JP 2013-054970", Translated on May 6, 2020, Originally published on Mar. 21, 2013 (Year: 2013).*
U.S. Appl. No. 16/246,828, filed Jan. 14, 2019.
Co-pending U.S. Appl. No. 16/246,828, filed Jan. 14, 2019.
Co-pending U.S. Appl. No. 16/299,856, filed Mar. 12, 2019.

* cited by examiner

*Primary Examiner* — Jimmy Vo
(74) *Attorney, Agent, or Firm* — Flynn Thiel, P.C.

(57) ABSTRACT

A fuel cell has an anode, a cathode active portion that exhibits oxygen ion conductivity and electron conductivity, a cathode current collecting portion that is disposed on the cathode active portion and that exhibits a higher electron conductivity than the cathode active portion, and a contaminant trap portion that is disposed on the cathode current collecting portion and exhibits oxygen ion conductivity and electron conductivity.

2 Claims, 5 Drawing Sheets

ELECTROCHEMICAL CELL WITH CONTAMINANT TRAP PORTION, AND ELECTROCHEMICAL DEVICE INCLUDING SAME

BACKGROUND

Technical Field

The present invention relates to an electrochemical cell and an electrochemical device.

Description of the Related Art

Typically, a solid oxide fuel cell includes a solid electrolyte layer disposed between an anode and a cathode. During operation of the solid oxide fuel cell, the anode is supplied with a fuel gas (for example, hydrogen gas), and the cathode is supplied with an oxidizer gas (for example, air).

Japanese Patent Application Laid-Open No. 2015-090788 discloses a method of placing a contaminant trap portion between an oxidizer gas supply port and the cathode in order to inhibit a reduction in the catalytic activity of the cathode resulting from a contaminant that is present in the oxidizer gas. The contaminant trap portion is separated from the cathode to avoid functioning as an electrical current pathway.

SUMMARY

However, the method disclosed in Japanese Patent Application Laid-Open No. 2015-090788 does not configure the contaminant trap portion in an active state since a current does not flow into the contaminant trap portion, and therefore there is a limitation on effective trapping of contaminants.

The present invention is proposed in light of the circumstances described above, and has the purpose of providing an electrochemical cell and an electrochemical device that enables effective trapping of the contaminants in an oxidizer gas.

An electrochemical cell has an anode, a cathode active portion that exhibits oxygen ion conductivity and electron conductivity, a solid electrolyte layer that is disposed between the anode and the cathode active portion, a cathode current collecting portion that is disposed on the cathode active portion and exhibits a higher electron conductivity than the cathode active portion, and a contaminant trap portion that is disposed on the cathode current collecting portion and exhibits oxygen ion conductivity and electron conductivity.

The present invention enables the provision of an electrochemical cell and an electrochemical device that enables effective trapping of the contaminants in an oxidizer gas.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

1. First Embodiment

Fuel Cell Stack 100

Figure 1:
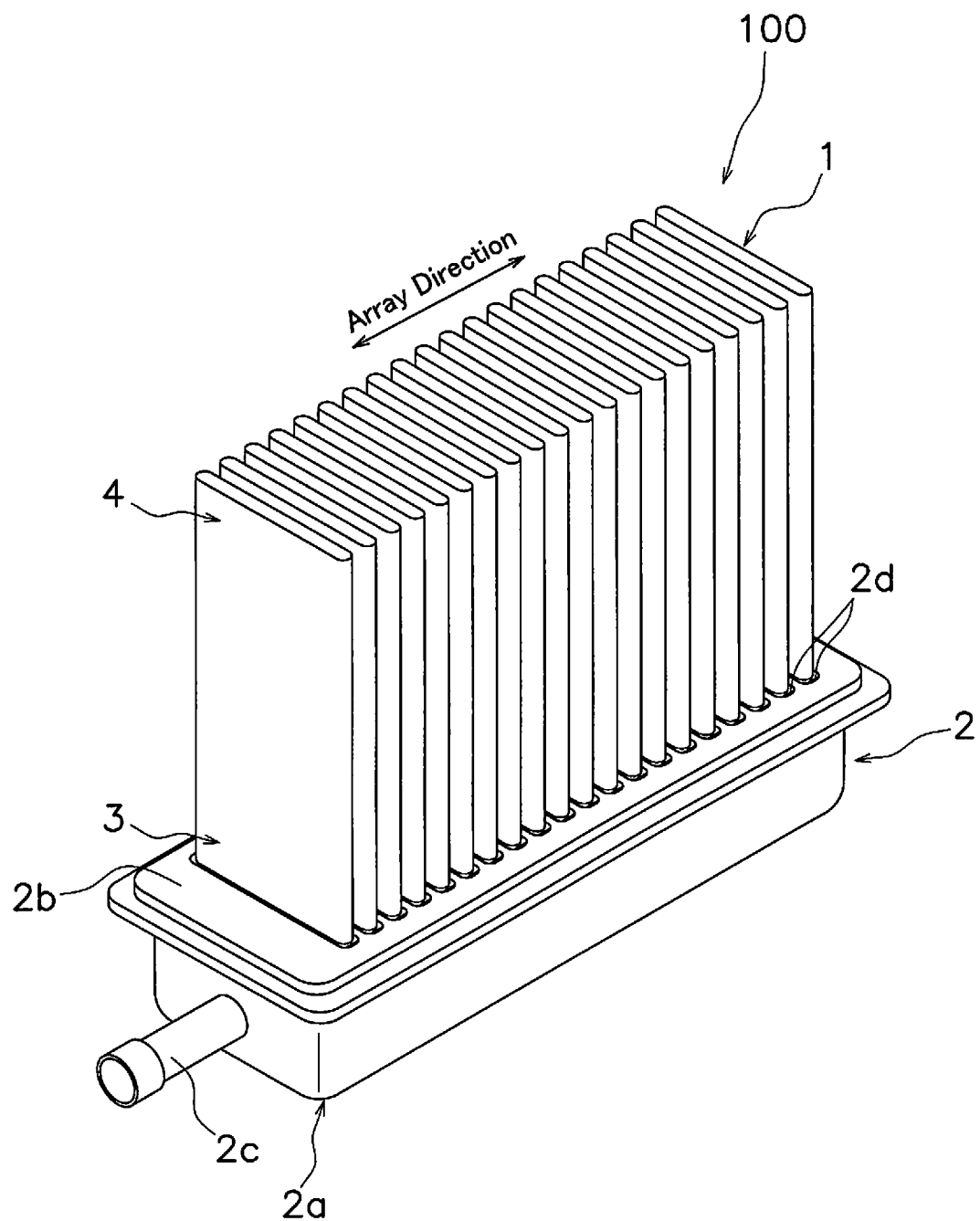
FIG. 1 is a perspective view of a fuel cell stack according to a first embodiment.

FIG. 1 is a perspective view of a fuel cell stack 100. The fuel cell stack 100 includes a plurality of fuel cells 1 and a manifold 2. In the present embodiment, a fuel cell 1 is an example of an electrochemical cell and the fuel cell stack 100 is an example of an electrochemical device.

The plurality of fuel cells 1 is arranged in series along an array direction. Each fuel cell 1 is disposed approximately in parallel in a substantially equidistant configuration. A base end 3 of each fuel cell 1 is fixed to the manifold 2. A distal end 4 of each fuel cell 1 is a free end. In this manner, each fuel cell 1 is supported in a cantilevered state by the manifold 2. The configuration of the fuel cell 1 will be described below.

The manifold 2 is configured to distribute gas to each fuel cell 1. The manifold 2 is hollow and has an internal cavity. The internal cavity of the manifold 2 is supplied with a fuel gas (for example, hydrogen) from a fuel gas supply source (not shown).

The manifold 2 supports each fuel cell 1. The manifold 2 includes a main body 2a, a top plate 2b, and an inflow pipe 2c. In the present embodiment, the main body 2a, the top plate 2b, and the inflow pipe 2c are mutually separate members but may be provided in an integrated configuration.

The main body 2a has a substantially rectangular shape and includes an inner cavity with an open upper surface. The main body 2a, for example, may be made of a metal material that exhibits heat resistant properties (for example, ferritic stainless steel, austenitic stainless steel, and Ni-based alloy, or the like).

The top plate 2b is disposed on the main body 2a to thereby close the upper surface of the main body 2a. The top plate 2a for example is bonded to the main body 2a, for example, by use of crystalline glass. The top plate 2b may be made of the same material as that used in the main body 2a.

The top plate 2b has a plurality of through holes 2d. Each through hole 2d connects the inner cavity of the manifold 2 to an external cavity. The base end 3 of each fuel cell 1 is inserted into each through hole 2d. The base end 3 of each fuel cell 1 is fixed to a through hole 2d by a bonding agent (for example, crystalline glass or the like). Crystalline glass, for example, includes use of $SiO_2$—$B_2O_3$-based, $SiO_2$—CaO-based, or $SiO_2$—MgO-based configurations.

External Configuration of Fuel Cell 1

Figure 2:
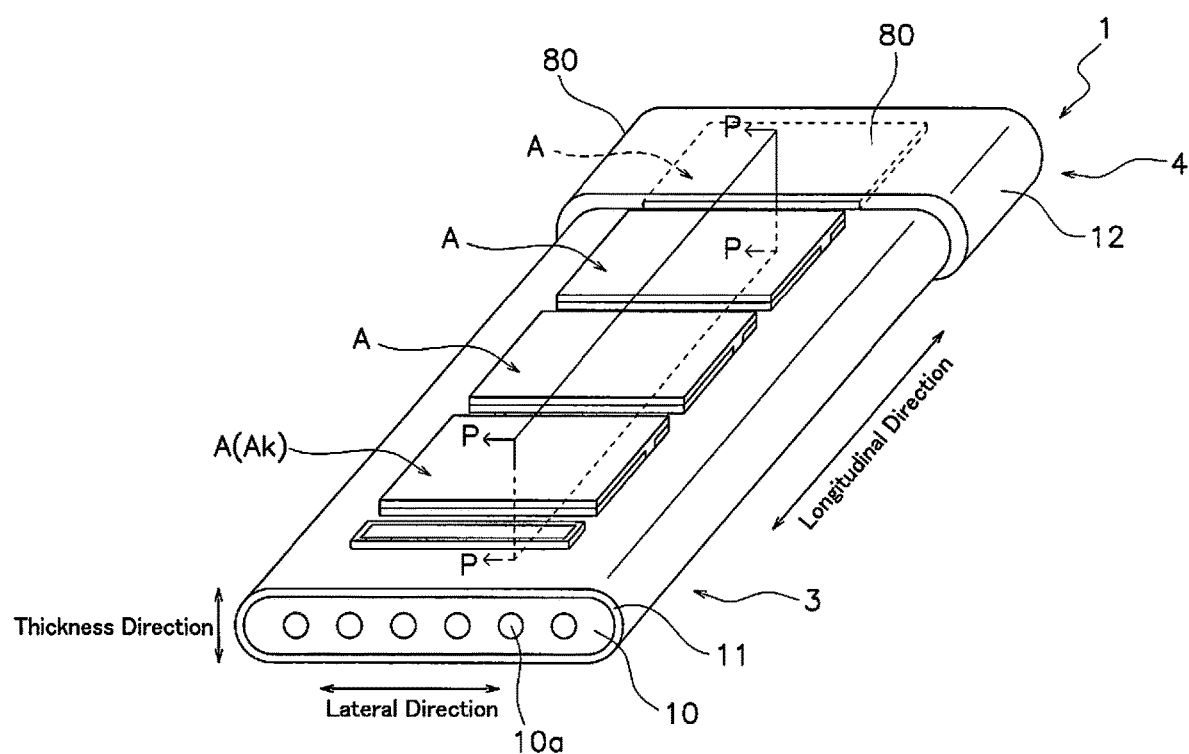
FIG. 2 is a perspective view of a fuel cell according to a first embodiment.

Next, the external configuration of the fuel cell 1 will be described. FIG. 2 is a perspective view of a fuel cell 1.

The fuel cell 1 is a segmented-in-series solid oxide fuel cell (SOFC). The fuel cell 1 includes 8 power generating elements A, a support substrate 10, a seal layer 11 and a front-rear connecting member 12.

Four of the 8 power generating elements A are disposed at a predetermined interval on the front surface of the support substrate 10 along the longitudinal direction of the support substrate 10, and are electrically connected in series. The remaining 4 power generating elements A are disposed at a predetermined interval on the rear surface of the support substrate 10 along the longitudinal direction of the support substrate 10, and are electrically connected in series.

In the following description, the power generating element A that is closest to the manifold 2 of the 4 power generating elements A that are disposed on the front surface of the support substrate 10 is termed the "base-end-side power generating element Ak" and the power generating element A that is closest to the manifold 2 of the 4 power generating elements A disposed on the rear surface of the support substrate 10 is termed the "base-end-side power generating element Aj." The base-end-side power generating element Ak and the base-end-side power generating element Aj are respectively power generating elements A that are disposed on the base end 3. The base-end-side power generating element Ak and the base-end-side power generating element Aj are respectively the closest power generating elements A to an inflow port of a gas flow passage 10a that is described below.

An outer surface of each power generating element A is supplied with an oxidizer gas. The oxidizer gas flows from the base end side towards the distal end side of the support substrate 10. The oxidizer gas, for example, includes use of a mixed gas of oxygen and another gas. It is particularly preferred that the oxidizer gas is safe and cost-effective air. The oxidizer gas may contain an inert gas such as nitrogen, argon, or the like.

The support substrate 10 is a flat plate that extends in a longitudinal direction. The support substrate 10 is made of a porous material that does not exhibit electron conductivity. The support substrate 10, for example, may be made of CSZ (calcia-stabilized zirconia). The support substrate 10 supports the 8 power generating elements A.

A plurality of gas flow passages 10a is formed in an inner portion of the support substrate 10. Each gas flow passage 10a is formed in a substantially parallel configuration at approximately equal intervals in the lateral direction of the support substrate 10. Each gas flow passage 10a extends along the longitudinal direction of the support substrate 10. Each gas flow passage 10a opens at both longitudinal end faces of the support substrate 10. Each gas flow passage 10a includes a fuel gas inflow port that is formed on the end face of the base end side of the support substrate 10 and a fuel gas outflow port that is formed on the end face of the distal end side of the support substrate 10.

The fuel gas includes hydrogen, a hydrocarbon, and a mixed gas of hydrogen and a hydrocarbon. The hydrocarbon includes, for example, natural gas, naphtha, and a coal gasification gas, or the like. However, there is no limitation in this regard. The fuel gas may be a single type of hydrocarbon or may be a mixture of two or more hydrocarbons. The fuel gas may contain an inert gas such as nitrogen, argon, or the like.

The seal layer 11 covers an external surface of the support substrate 10. The seal layer 11 may be configured by a dense material. The dense material, for example, includes YSZ, ScSZ, glass, spinel oxides, or the like. The seal layer 11 may be integrated by use of a material that is the same as a solid electrolyte layer 40 of each of the power generating element A as described below.

The front-rear connecting member 12 is placed to encompass the distal end 4. The front-rear connecting member 12 enables an electrical connection in series of 2 front and back power generating elements A that are disposed on the distal end 4.

The front-rear connecting member 12, for example, may be made of LSCF=(La,Sr)(Co,Fe)$O_3$ (lanthanum strontium cobalt ferrite), LSC=(La,Sr)Co$O_3$ (lanthanum strontium cobaltite), or La(Ni,Fe,Cu)$O_3$, or the like.

Inner Configuration of Fuel Cell 1

Figure 3:
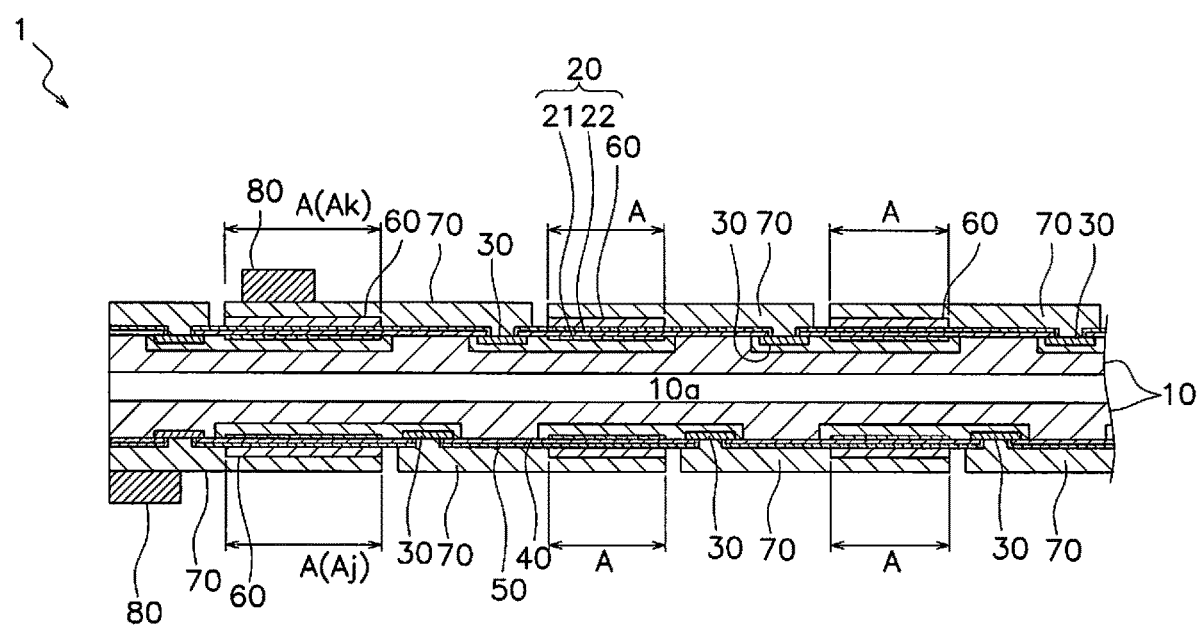
FIG. 3 is a sectional view of a fuel cell according to a first embodiment.

Next, the inner configuration of the fuel cell 1 will be described. FIG. 3 is a sectional view of a P surface of the fuel cell 1.

Each power generating element A of the fuel cell 1 includes an anode 20, an interconnector 30, the solid electrolyte layer 40, a barrier layer 50, a cathode active portion 60, and a cathode current collecting portion 70.

The anode 20 includes an anode current collecting portion 21 and an anode active portion 22. The anode current collecting portion 21 is disposed on the support substrate 10. The anode current collecting portion 21, for example, may be made of NiO (nickel oxide) and YSZ (8YSZ) (yttria-stabilized zirconia). Although there is no particular limitation on the thickness of the anode current collecting portion 21, it may be configured as 50 to 500 μm, for example. The anode active portion 22 is disposed on the anode current collecting portion 21. The anode active portion 22, for example, may be made of NiO (nickel oxide) and YSZ (8YSZ) (yttria-stabilized zirconia). Although there is no particular limitation on the thickness of the anode active portion 22, for example, it may be from 5 to 30 μm.

The interconnector 30 is disposed in a separate position from the anode active portion 22 on the anode current collecting portion 21. The interconnector 30 is made of a dense material that exhibits electron conductivity. The interconnector 30, for example, is made using LaCr$O_3$ (lanthanum chromite). Although there is no particular limitation on the thickness of the interconnector 30, for example, it may be from 10 to 100 μm.

The solid electrolyte layer 40 is disposed to cover the anode 20. The solid electrolyte layer 40 is placed in contact with the respective interconnectors 30 of adjacent power generating elements A. The solid electrolyte layer 40 is made of a dense material that exhibits ion conductivity and does not exhibit electron conductivity. The solid electrolyte layer 40 is made of, for example, YSZ (8YSZ) (yttria-stabilized zirconia). Although there is no particular limitation on the thickness of the solid electrolyte layer 40, for example, it may be from 3 to 50 μm.

The barrier layer 50 is disposed to cover the solid electrolyte layer 40. The barrier layer 50 is made of a dense material. The barrier layer 50 is made of, for example, GDC ((Ce, Gd)$O_2$: gadolinium-doped ceria). Although there is no particular limitation on the thickness of the solid electrolyte layer 40, for example, it may be from 3 to 50 μm.

The cathode active portion 60 covers the barrier layer 50. The cathode active portion 60 is responsible for power generation reactions in the fuel cell 1. The cathode active portion 60 exhibits oxygen ion conductivity and electron conductivity. The cathode active portion 60 contains, as a main component, a composite material that is a mixture of an oxygen ion conductive material and an electron conductive material, or a mixed conductive material exhibiting both oxygen ion conductivity and electron conductivity.

In the present embodiment, when the composition X "contains as a main component" material Y that means material Y preferably occupies at least 60 wt % of the total of composition X, more preferably occupies at least 70 wt %, and still more preferably occupies at least 90 wt %.

The mixed conductive material includes a perovskite composite oxide that contains at least one of Sr and La at the A site and that is expressed by the general formula ABO₃. This type of perovskite composite oxide includes a material such as LSF ((La, Sr) FeO₃), and LSC ((La, Sr)CoO₃), or the like, and in particular, LSCF ((LaSr)(CoFe)O₃) is preferred. The cathode active portion 60 may contain a zirconia-based material such as yttria-stabilized zirconia including 3YSZ, 8YSZ, 10YSZ or the like, scandia-stabilized zirconia such as ScSZ, or the like.

Although there is no particular limitation on the thickness of the cathode active portion 60, for example, it may be from 5 to 100 μm.

The cathode current collecting portion 70 is disposed on the cathode active portion 60. The cathode current collecting portion 70 is placed in contact with the cathode active portions 60 and the interconnectors 30 of adjacent power generating elements A. The cathode current collecting portion 70 is a porous fired body. The cathode current collecting portion 70 is the portion that supplies electrons required for power generation reactions in the fuel cell 1 to the cathode active portion 60.

The cathode current collecting portion 70 exhibits higher electron conductivity than the cathode active portion 60. The cathode current collecting portion 70 may not have oxygen ion conductivity properties, but may exhibit oxygen ion conductivity. Although the material used in the cathode current collecting portion 70 includes use of a metal material such as Ag (silver), Ag—Pd (silver palladium alloy), or the like, a material including a perovskite composite oxide that contains at least one of Sr and La at the A site and that is expressed by the general formula ABO₃ as a main component is suitable. A material including a perovskite composite oxide that contains at least one of Sr and La at the A site and that is expressed by the general formula ABO₃ as a main component includes, for example, (La, Sr)CoO₃, La(Ni, Fe, Cu)O₃, or the like. In particular, a perovskite composite oxide as expressed by Formula (1) below is preferred.

$$La(Ni_{1-x-y}Fe_xCu_y)O_{3-\delta} \quad (1)$$

In Formula (1), x is greater than or equal to 0.03 and less than or equal to 0.3, y is greater than or equal to 0.05 and less than or equal to 0.5, and δ is greater than or equal to 0 and less than or equal to 0.8. However, the arrangement of $Ni_{1-x-y}Fe_xCu_y$ at the B site is not affected by the x value and y value.

Although there is no particular limitation on the thickness of the cathode current collecting portion 70, for example, it may from 30 to 500 μm.

Here, the respective base-end-side power generating element Ak and the base-end-side power generating element Aj further include a contaminant trap portion 80.

The contaminant trap portion 80 is disposed on the cathode current collecting portion 70. The contaminant trap portion 80 traps (adsorbs or removes) a contaminant contained in the oxidizer gas that flows along a surface and/or an inner portion.

A contaminant is defined as a substance in the oxidizer gas that can be adsorbed by the cathode 60 and decreases catalytic activity. For example, when a contaminant reacts with the compound oxide in the cathode 60 and generates a reaction product, this reaction products blocks the holes in the cathode 60 and the cathode 60 is no longer supplied with a sufficient amount of oxidizer gas. As a result, there is insufficient catalytic activity of the cathode 60. There is also the possibility that the contaminant will react with the compound oxide of the cathode 60 and be transformed into another substance that has no catalytic activity. When the catalytic activity of the cathode 60 decreases, the fuel cell 1 loses power generation performance.

Examples of the contaminant include a substance containing at least one type of element among S, Cr, Si, B and Cl (for example, SOS). The contaminant may contain H₂O.

The contaminant trap portion 80 exhibits oxygen ion conductivity and electron conductivity. The contaminant trap portion 80 contains, as a main component, a composite material that is a mixture of an oxygen ion conductive material and an electron conductive material, or a mixed conductive material exhibiting both oxygen ion conductivity and electron conductivity. The mixed conductive material may be the materials given above as examples of a material for use in the cathode active portion 60. The contaminant trap portion 80 may include the constituent material for the cathode active portion 60, or may omit the constituent material for the cathode active portion 60.

It is more preferred that the contaminant trap portion 80 includes a contaminant as described above. In this manner, efficient trapping of contaminants is enabled due to the enhanced reactivity of the contaminant trap portion 80. Inclusion of a contaminant in the contaminant trap portion 80 may be performed by doping a material that exhibits oxygen ion conductivity and electron conductivity as described above with a contaminant and then applying a thermal treatment (600 degrees C. to 1200 degrees C., 1 hour to 120 hours).

The contaminant trap portion 80 enables permeation of the oxidizer gas. Although there is no particular limitation in relation to the porosity of the contaminant trap portion 80, the porosity may be greater than or equal to 10% and less than or equal to 50% as measured by an Archimedes Method. Although there is no particular limitation in relation to the shape of the contaminant trap portion 80, for example, it may be rectangular, spherical or the like in addition to membranous, layered or a plate shape.

In this manner, the contaminant trap portion 80 that exhibits oxygen ion conductivity and electron conductivity is disposed on the cathode current collecting portion 70 at the respective base-end-side power generating element Ak and the base-end-side power generating element Aj that are respectively closest to the manifold 2. Therefore, activity of the contaminant trap portion 80 itself can be enhanced to thereby enable the contaminant trap portion 80, together with the cathode current collecting portion 70, to function as a portion of the electrical current pathway associated with chemical reactions in the fuel cell 1. Consequently, contaminants can be efficiently trapped by the contaminant trap portion 80. Furthermore, since the contaminant trap portion 80 is respectively placed in the base-end-side power generating element Ak and the base-end-side power generating element Aj that are closest to the manifold 2, supply of the oxidizer gas to each power generating element A is enabled after trapping (adsorption, removal) of contaminants.

Method of Manufacturing Fuel Cell 1

Next, an example of a method of manufacturing the fuel cell 1 will be described.

First, a support substrate material as described above is extrusion molded to form a green body for the support substrate 10 that includes the gas flow passage 10a. Then, a recessed portion is formed on the front and rear surfaces of the green body for the support substrate 10 to accommodate a green body for the anode current collecting portion 21.

Then, an anode current collecting portion material as described above is configured as a paste and screen printed to thereby form a green body for the anode current collecting portion 21 in the recessed portion of the support substrate 10. In addition, a recessed portion is formed on the front surface of the green body for the anode current collecting portion 21 to accommodate a green body for the anode active portion 22 and the interconnector 30.

Then, an anode active portion material as described above is configured as a paste and screen printed to form a green body for the anode active portion 22 in the recessed portion of the anode current collecting portion 21.

Then, an interconnector material as described above is configured as a paste and screen printed to form a green body for the interconnector 30 in the recessed portion of the anode current collecting portion 21.

Then, a solid electrolyte layer material as described above is configured as a paste and screen printed to form a green body for the solid electrolyte layer 40 on the green body for the interconnector 30 and the anode 20.

Then, a barrier layer material is dip molded onto the green body for the solid electrolyte layer 40 to form a green body for the barrier layer 50.

Next, the respective green bodies for the support substrate 10, the anode 20, the interconnector 30, the solid electrolyte layer 40 and the barrier layer 50 are co-fired (1300 to 1600 degrees C., 2 to 20 hours).

Then, a cathode active portion material as described above is configured as a paste and screen printed onto the barrier layer 50 to form a green body for the cathode active portion 60.

Then, a cathode current collecting portion material as described above is configured as a paste and screen printed onto the green body for the cathode active portion 60 to form a green body for the cathode current collecting portion 70.

Then, a contaminant trap portion material as described above is configured as a paste and screen printed onto the green body for the cathode current collecting portion 70 to form a green body for the contaminant trap portion 80.

Next, the respective green bodies for the cathode active portion 60, the cathode
current collecting portion 70 and the contaminant trap portion 80 are fired (900 to 1100 degrees C., 1 to 20 hours).

2. Second Embodiment

Configuration of Fuel Cell Device 101

Figure 4:
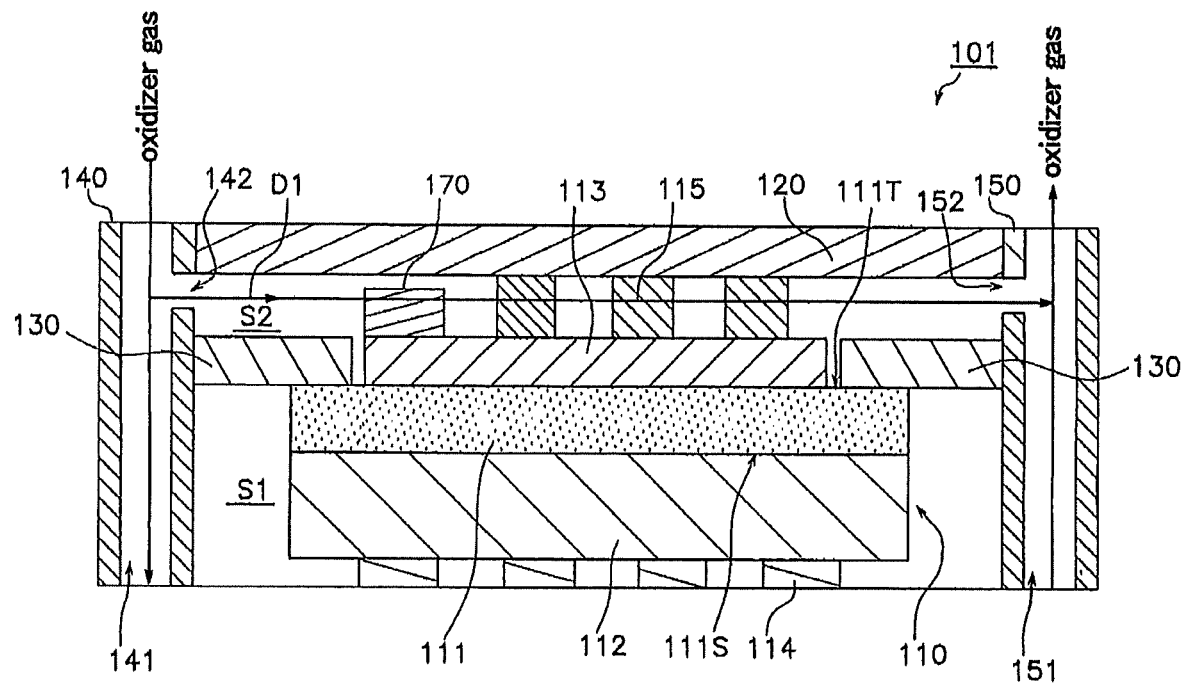
FIG. 4 is a sectional view of a fuel cell device according to a second embodiment.

The configuration of the fuel cell device 101 according to a second embodiment will be described with reference to the drawings. FIG. 4 is a sectional view of a fuel cell device 101.

The fuel cell device 101 includes a fuel cell 110, an interconnector 120, a separator 130, an oxidizer gas supply portion 140, an oxidizer gas discharge portion 150 and a contaminant trap portion 170. A fuel cell stack is configured by stacking a plurality of layers of the fuel cell device 101. In the present embodiment, the fuel cell 110 is an example of an electrochemical cell and the fuel cell device 101 is an example of an electrochemical device.

Fuel Cell 110

The fuel cell 110 includes a solid electrolyte layer 111, an anode 112, a cathode 113, an anode-side current collecting portion 114, and a cathode-side current collecting portion 115.

The fuel cell 110 according to the present embodiment is an anode-supporting cell having a conspicuously thick anode 112 in comparison to the cathode 113 and the solid electrolyte layer 111. However, there is no limitation in this regard. The fuel cell 110 may be a cathode-supporting cell having a conspicuously thick cathode 113 in comparison to the anode 112 and the solid electrolyte layer 111, or may be a solid electrolyte layer-supporting cell having a conspicuously thick solid electrolyte layer 111 in comparison to the anode 112 and the cathode 113.

The solid electrolyte layer 111 is formed as a thin plate. The thickness of the solid electrolyte layer 111 may be configured as greater than or equal to 3 μm and less than or equal to 20 μm. The solid electrolyte layer 111 is configured by an electrolytic material that exhibits oxygen ion conductivity in which oxygen ions produced at the cathode 113 migrate to the anode 112. This type of electrolytic material for example includes use of one type, or a combination of two or more types of yttria-stabilized zirconia (YSZ), scandia-stabilized zirconia (ScSZ), samarium added ceria ($CeSmO_2$), gadolium added ceria ($CeGdO_2$), and calcia-stabilized zirconia (CaSZ).

The solid electrolyte layer 111 is a dense substance. The solid electrolyte layer 111 prevents permeation of an oxidizer gas toward the anode 112 and permeation of a fuel gas towards the cathode 113. The relative density of the solid electrolyte layer 111 obtained by use of an Archimedes Method is preferably greater than or equal to 95%.

The anode 112 is disposed on a first main surface 111S of the solid electrolyte layer 111. The anode 112 functions as an anode for the fuel cell 110. The anode 112 is a porous body.

The anode 112 is disposed in a fuel gas chamber S1. The fuel gas chamber S1 is supplied with a fuel gas from a fuel gas supply portion (not illustrated). The fuel gas includes hydrogen, a hydrocarbon, and a mixed gas of hydrogen and a hydrocarbon. The hydrocarbon includes, for example, natural gas, naphtha, and a coal gasification gas, or the like. However, there is no limitation in this regard. The fuel gas may be a single type of hydrocarbon, or may be a mixture of two or more hydrocarbons. The fuel gas may contain an inert gas such as nitrogen, argon, or the like.

The anode 112 is configured by a known anode material. For example, the anode 112 may be made using a mixture of the electrolytic material described above and a metal such as Ni and/or Fe, or the like.

The cathode 113 is disposed on a second main surface 111T of the solid electrolyte layer 111. The cathode 113 functions as a cathode for the fuel cell 110. The cathode 113 is a porous body. Although there is no limitation in relation to the porosity of the cathode 113, it may be greater than or equal to 110%. Although there is no limitation in relation to the thickness of the cathode 113, for example, it may be greater than or equal to 130 μm and less than or equal to 1200 μm.

The cathode 113 is disposed in an oxidizer gas chamber S2. The oxidizer gas chamber S2 is supplied with an oxidizer gas from an oxidizer gas supply portion 140. The oxidizer gas passes through the cathode 113 and then is discharged from the oxidizer gas chamber S2 by the oxidizer gas discharge portion 150. The oxidizer gas is preferably air.

The cathode 113 is made using a material that exhibits oxygen ion conductivity and electron conductivity. This type of material is suitably a composite oxide that includes at least one type of element of La, Sr, Co and Fe. The composite oxide includes an $La_{1-x}Sr_xCoO_3$ composite oxide, an $La_{1-x}Sr_xFeO_3$ composite oxide, an $La_{1-x}Sr_xCo_{1-y}Fe_yO_3$ composite oxide, an $La_{1-x}Sr_xMnO_3$ composite oxide, a $Pr_{1-x}Ba_xCoO_3$ composite oxide, and a $Sm_{1-x}Sr_xCoO_3$ composite oxide, or the like.

The anode-side current collecting portion 114 is electrically and mechanically connected with the anode 112. The constituent material used in the anode-side current collecting portion 114, for example, includes an Ni felt that exhibits breathability. The anode-side current collecting portion 114 is sandwiched between the anode 112 and the interconnector 120 when the fuel cell device 101 is configured from a plurality of layers. The anode-side current collecting portion 114 may be integrally formed with the interconnector 120.

The cathode-side current collecting portion 115 is electrically and mechanically connected with the cathode 113. The constituent material used in the cathode-side current collecting portion 115 includes, for example, a metal material such as Ag—Pd or the like. The cathode-side current collecting portion 115 is sandwiched between the cathode 113 and the interconnector 120. The cathode-side current collecting portion 115 may be integrally formed with the interconnector 120.

Interconnector 120

The interconnector 120 is electrically connected with the cathode 113. In the present embodiment, the interconnector 120 makes electrical contact with the cathode 113 through the cathode-side current collecting portion 115. The interconnector 120 is electrically and mechanically connected with the cathode-side current collecting portion 115. The interconnector 120 is sandwiched between two adjacent fuel cells 110 when the fuel cell device 101 is made of a plurality of layers. In this case, the interconnector 120 is electrically and mechanically connected with the anode-side current collecting portion 114 and the cathode-side current collecting portion 115, respectively.

The interconnector 120 may be made of a metal, preferably stainless steel.

Separator 130

The separator 130 is disposed to encircle the periphery of the fuel cell 110. The separator 130 according to the present embodiment is connected to the second main surface 111T of the solid electrolyte layer 111, and is disposed to encircle the cathode 113.

The separator 130 partitions the fuel gas chamber S1 and the oxidizer gas chamber S2. That is to say, in the same manner as the solid electrolyte layer 111, the separator 130 prevents permeation of oxidizer gas towards the anode 112 and permeation of fuel gas towards the cathode 113.

The separator 130 is made of a metal, preferably stainless steel.

Oxidizer Gas Supply Portion 140

The oxidizer gas supply portion 140 is disposed on the side of the fuel cell 110. The oxidizer gas supply portion 140 includes an oxidizer gas supply passage 141 and an oxidizer gas supply port 142.

The oxidizer gas supply passage 141 extends along a stacking direction of the fuel cell 110. When the fuel cell device 101 is configured from a plurality of layers, one oxidizer gas supply passage is formed by connecting the oxidizer gas supply passages 141.

The oxidizer gas supply port 142 is connected to the oxidizer gas supply passage 141. The oxidizer gas supply port 142 opens onto the oxidizer gas chamber S2. The oxidizer gas supply port 142 opens towards the fuel cell 110.

An oxidizer gas flows sequentially through the oxidizer gas supply passage 141 and the oxidizer gas supply port 142 and is thereby supplied to the oxidizer gas chamber S2. The oxidizer gas that is supplied from the oxidizer gas supply portion 140 to the oxidizer gas chamber S2 as shown in FIG. 1 flows along the flow direction DI into the oxidizer gas chamber S2. The flow direction DI is a direction from the oxidizer gas supply port 142 to the oxidizer gas discharge port 152 described below. The flow direction DI is defined by a straight line that connects the center of the oxidizer gas supply port 142 and the center of the oxidizer gas discharge port 152. When there is provision of a plurality of at least one of the oxidizer gas supply port 142 and the oxidizer gas discharge port 152, the flow direction DI is defined by a straight line that connects the center of any one of the oxidizer gas supply ports 142 and the center of any one of the oxidizer gas discharge ports 152.

Oxidizer Gas Discharge Portion 150

The oxidizer gas discharge portion 150 is disposed on the side of the fuel cell 110. The oxidizer gas discharge portion 150 includes an oxidizer gas discharge passage 151 and an oxidizer gas discharge port 152.

The oxidizer gas discharge passage 151 extends along a stacking direction of the fuel cell 110. When the fuel cell device 101 is composed of a plurality of layers, one oxidizer gas discharge passage is formed by connecting the oxidizer gas discharge passages 151.

The oxidizer gas discharge port 152 is connected to the oxidizer gas discharge passage 151. The oxidizer gas discharge port 152 opens onto the oxidizer gas chamber S2. The oxidizer gas discharge port 152 opens towards the fuel cell 110.

The oxidizer gas that is supplied from the oxidizer gas supply port 142 to the oxidizer gas chamber S2, and that has passed along the flow direction D1 into the oxidizer gas chamber S2, is discharged from the oxidizer gas discharge portion 152 into the oxidizer gas discharge passage 151.

Contaminant Trap Portion 170

The contaminant trap portion 170 in the present embodiment is disposed on a portion of the cathode 113 on the side with the oxidizer gas supply port 142. The portion of the cathode 113 on the side with the oxidizer gas supply port 142 is a portion in proximity to the oxidizer gas supply port 142 with reference to the center of the cathode 113 in the flow direction D1. The contaminant trap portion 170 is preferably disposed in proximity to the oxidizer gas supply port 142 and, as shown in FIG. 4, is more preferably disposed on an end portion of the cathode 113 on the side with the oxidizer gas supply port 142.

A contaminant is defined as a substance in the oxidizer gas that can be adsorbed by the cathode 113 to decrease catalytic activity. For example, when a contaminant reacts with the compound oxide in the cathode 113 and generates a reaction product, this reaction products blocks the holes in the cathode 113 and the cathode 113 is no longer supplied with a sufficient amount of oxidizer gas. As a result, there is insufficient catalytic activity of the cathode 113. There is also the possibility that the contaminant will react with the compound oxide of the cathode 113 and be transformed into another substance that has no catalytic activity. When the catalytic activity of the cathode 113 decreases, the fuel cell 110 loses power generation performance.

Examples of the contaminant include a substance containing at least one type of element among S, Cr, Si, B and Cl (for example, $SO_x$). The contaminant may contain $H_2O$.

The contaminant trap portion 170 exhibits oxygen ion conductivity and electron conductivity. The contaminant trap portion 170 contains, as a main component, a composite material that is a mixture of an oxygen ion conductive material and an electron conductive material, or a mixed conductive material exhibiting both oxygen ion conductivity and electron conductivity.

The contaminant trap portion 170 preferably contains a metal oxide. The metal oxide is preferably an oxide of at least one element selected from the group consisting of La, Sr, Sm, Gd, Pr, Nd, Co and Fe. The metal oxide is preferably a compound oxide.

It is preferred that the contaminant trap portion 170 further includes a contaminant as described above. In this manner, efficient trapping of contaminants is enabled due to the enhanced reactivity of the contaminant trap portion 170. Inclusion of a contaminant in the contaminant trap portion 170 may be performed by doping a metal oxide as described above with a contaminant and then applying a thermal treatment (600 degrees C. to 1200 degrees C., 1 hour to 120 hours).

The contaminant trap portion 170 enables permeation of the oxidizer gas. Although there is no particular limitation in relation to the porosity of the contaminant trap portion 170, the porosity may be greater than or equal to 10% and less than or equal to 50% as measured by an Archimedes Method. Although there is no particular limitation in relation to the shape of the contaminant trap portion 170, for example, it may be rectangular, spherical or the like in addition to membranous, layered or a plate shape.

In this manner, the contaminant trap portion 170 that exhibits oxygen ion conductivity and electron conductivity is disposed on a portion of the cathode 113 on the side with the oxidizer gas supply port 142.

Therefore, the contaminant trap portion 170 together with the cathode 113 functions as a portion of the current pathway associated with chemical reactions in the fuel cell 110, and thereby the activity of the contaminant trap portion 170 itself is enhanced. Consequently, efficient trapping of contaminants by the contaminant trap portion 170 is enabled.

Since the contaminant trap portion 170 is disposed on a portion on the side with the oxidizer gas supply port 142, it is possible to supply oxidizer gas to the contaminant trap portion 170 prior to an increase in the temperature of the oxidizer gas to the atmospheric temperature in the oxidizer gas chamber S2. Therefore, since the oxidizer gas is supplied to the contaminant trap portion 170 at a relatively low temperature, there is mild molecular motion in the contaminant trap portion 170. As a result, efficient trapping of contaminants by the contaminant trap portion 170 is enabled.

Method of Manufacturing Fuel Cell Device 101

Next, an example of a method of manufacturing the fuel cell device 101 will be described.

First, a slurry for the cathode 113 and a slurry for the contaminant trap portion 170 are coated and dried in sequence on the second main surface 111T of a green sheet for the solid electrolyte layer 111 that is stacked onto a green sheet for the anode 112 and fired to form a fuel cell 110 and a contaminant trap portion 170.

Then, a separator 130 is attached by brazing onto the second main surface 111T of the solid electrolyte layer 111.

The anode-side current collecting portion 114 is connected with the anode 112 and the cathode-side current collecting portion 115 and the interconnector 120 are sequentially connected with the cathode 113.

Then, an oxidizer gas supply portion 140 and an oxidizer gas discharge portion 150 are disposed on the side of the fuel cell 110 that is connected with the interconnector 120 and the separator 130.

3. Modified Example of Second Embodiment

Figure 5:
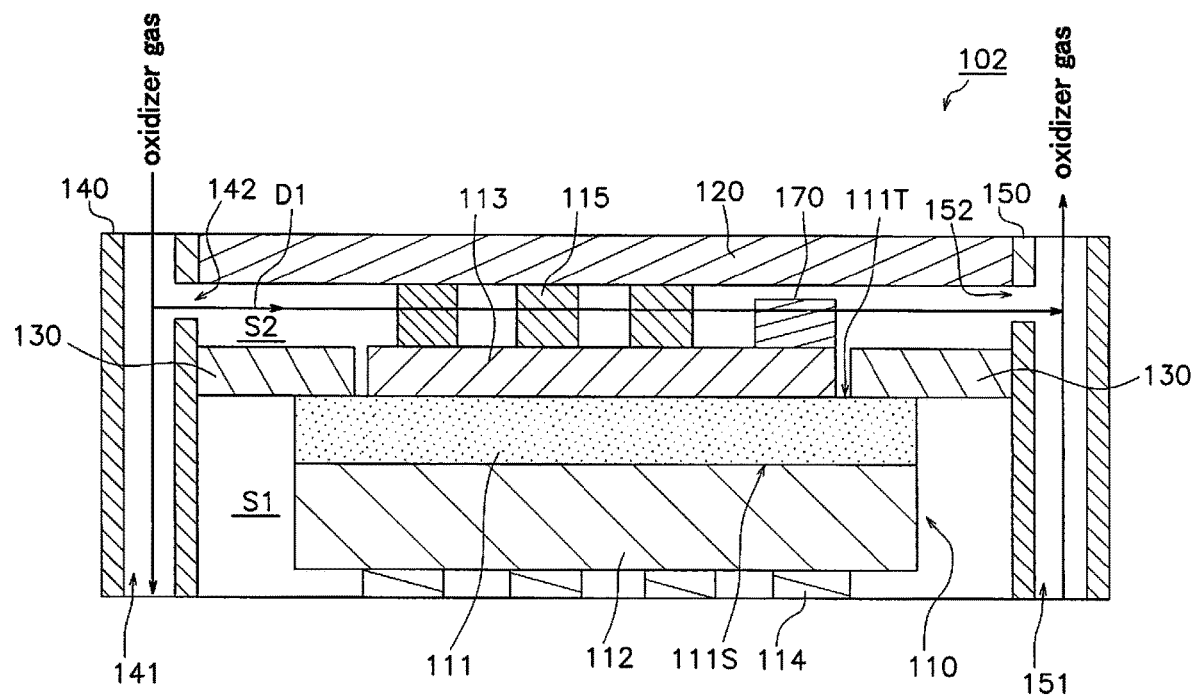
FIG. 5 is a sectional view of a fuel cell device according to modified example of a second embodiment.

The configuration of the fuel cell device 102 according to a modified example of the second embodiment will be described with reference to the drawings. FIG. 5 is a sectional view of the configuration of the fuel cell device 102.

The point of difference between the second embodiment described above and the modified example is the position of disposition of the contaminant trap portion. Therefore, the following description will focus on the point of difference.

The fuel cell device 101 includes a contaminant trap portion 170. The contaminant trap portion 170 is disposed on a portion of the cathode 113 on the side with the oxidizer gas discharge port 152. The portion of the cathode 113 on the side with the oxidizer gas discharge port 152 is a portion in proximity to the oxidizer gas discharge port 152 with reference to the center of the cathode 113 in the flow direction D1. The contaminant trap portion 170 is preferably disposed in proximity to the oxidizer gas discharge port 152 and, as shown in FIG. 5, is more preferably disposed on an end portion of the cathode 113 on the side with the oxidizer gas discharge port 152.

The contaminant trap portion 170 exhibits oxygen ion conductivity and electron conductivity. The contaminant trap portion 170 contains, as a main component, a composite material that is a mixture of an oxygen ion conductive material and an electron conductive material, or a mixed conductive material exhibiting both oxygen ion conductivity and electron conductivity.

The contaminant trap portion 170 preferably contains a metal oxide. The metal oxide is preferably an oxide of at least one element selected from the group consisting of La, Sr, Sm, Gd, Pr, Nd, Co and Fe. The metal oxide is preferably a compound oxide.

It is preferred that the contaminant trap portion 170 further includes a contaminant (for example, at least one type of element of S, Cr, Si, B and Cl). In this manner, efficient trapping of contaminants is enabled due to the enhanced reactivity of the contaminant trap portion 170. Inclusion of a contaminant in the contaminant trap portion 170 may be performed by doping a metal oxide as described above with a contaminant and then applying a thermal treatment (600 degrees C. to 1200 degrees C., 1 hour to 120 hours).

The contaminant trap portion 170 enables permeation of the oxidizer gas. Although there is no particular limitation in relation to the porosity of the contaminant trap portion 170, the porosity may be greater than or equal to 10% and less than or equal to 50% as measured by an Archimedes Method. Although there is no particular limitation in relation to the shape of the contaminant trap portion 170, for example, it may be rectangular, spherical or the like in addition to membranous, layered or a plate shape.

In this manner, the contaminant trap portion 170 that exhibits oxygen ion conductivity and electron conductivity is disposed on a portion of the cathode 113 on the side with the oxidizer gas discharge port 152.

Therefore, the contaminant trap portion 170 together with the cathode 113 functions as a portion of the current pathway associated with chemical reactions in the fuel cell 110, and thereby the activity of the contaminant trap portion 170 itself is enhanced. Consequently, efficient trapping of contaminants by the contaminant trap portion 170 is enabled.

Since the contaminant trap portion 170 is disposed on a portion on the side with the oxidizer gas discharge port 152, a contaminant in the oxidizer gas is trapped as a result of backflow from the oxidizer gas discharge port 152 into the oxidizer gas chamber S2 that has a negative pressure as a result of a reduction in temperature when operation of the fuel cell device 101 is stopped.

Other Embodiments

Although an embodiment of the present invention has been described, the present invention is not limited to the above embodiment, and various modifications are possible within a scope that does not depart from the spirit of the invention.

Although the first embodiment described a fuel cell device 1 provided with a fuel cell 10 as an example of an electrochemical device provided with an electrochemical cell, and the second embodiment described a fuel cell device 100 as an example of an electrochemical device provided with an electrochemical cell, there is no limitation in this regard. The electrochemical device includes a configuration in which an electrochemical cell is an electrolytic cell that produces hydrogen and oxygen from water vapor.

Although the first embodiment described a segmented-in-series fuel cell 1 as an example of an electrochemical cell, and the second embodiment described a flat plate fuel cell 1 as an example of an electrochemical cell, there is no limitation in this regard. The contaminant trap portion 80 according to the present invention may also be applied to an anode supported flat-tubular fuel cell.

In the first embodiment, the base-end-side power generating element Ak and the base-end-side power generating element Aj that are closest to the manifold 2 respectively include the contaminant trap portion 80. However, there is no limitation in this regard. A power generating element A other than the base-end-side power generating element Ak and the base-end-side power generating element Aj may include the contaminant trap portion 80, or at least one of the base-end-side power generating element Ak and the base-end-side power generating element Aj may include the contaminant trap portion 80. The contaminant trap portion 80 is preferably placed on a power generating element A that is upstream in relation to the gas flow direction of the oxidizer gas. Furthermore, the contaminant trap portion 80 is preferably placed in a region of the surface of the cathode-side current collecting portion 70 that is upstream in relation to the gas flow direction of the oxidizer gas.

REFERENCE SIGNS LIST

1 FUEL BATTERY
2 MANIFOLD
100 FUEL CELL STACK
A POWER GENERATING ELEMENT
Ak BASE-END-SIDE POWER GENERATING ELEMENT
Aj BASE-END-SIDE POWER GENERATING ELEMENT

What is claimed is:

1. An electrochemical cell comprising:
an anode;
a cathode active portion exhibiting oxygen ion conductivity and electron conductivity;
a solid electrolyte layer disposed between the anode and the cathode active portion;
a cathode current collecting portion disposed on the cathode active portion and exhibiting a higher electron conductivity than the cathode active portion; and
a contaminant trap portion disposed on the cathode current collecting portion and exhibiting oxygen ion conductivity and electron conductivity, wherein
a first side of the cathode active portion faces the solid electrolyte layer and the contaminant trap portion is located at an opposite side of the cathode active portion to the first side with the cathode current collecting portion disposed therebetween.

2. An electrochemical device comprising:
an electrochemical cell; and
a manifold supporting a base end of the electrochemical cell; and
the electrochemical cell having a support substrate exhibiting insulating properties and including a gas flow passage in an inner portion, and a plurality of power generating elements disposed on the support substrate, and
a base end side power generation element closest to the base end of the plurality of power generating elements including, an anode, a cathode active portion exhibiting oxygen ion conductivity and electron conductivity, a solid electrolyte layer disposed between the anode and the cathode active portion, a cathode current collecting portion disposed on the cathode active portion and exhibiting a higher electron conductivity than the cathode active portion, and a contaminant trap portion disposed on the cathode current collecting portion and exhibiting oxygen ion conductivity and electron conductivity, wherein
a first side of the cathode active portion faces the solid electrolyte layer and the contaminant trap portion is located at an opposite side of the cathode active portion to the first side with the cathode current collecting portion disposed therebetween.

* * * * *